Figure 4:
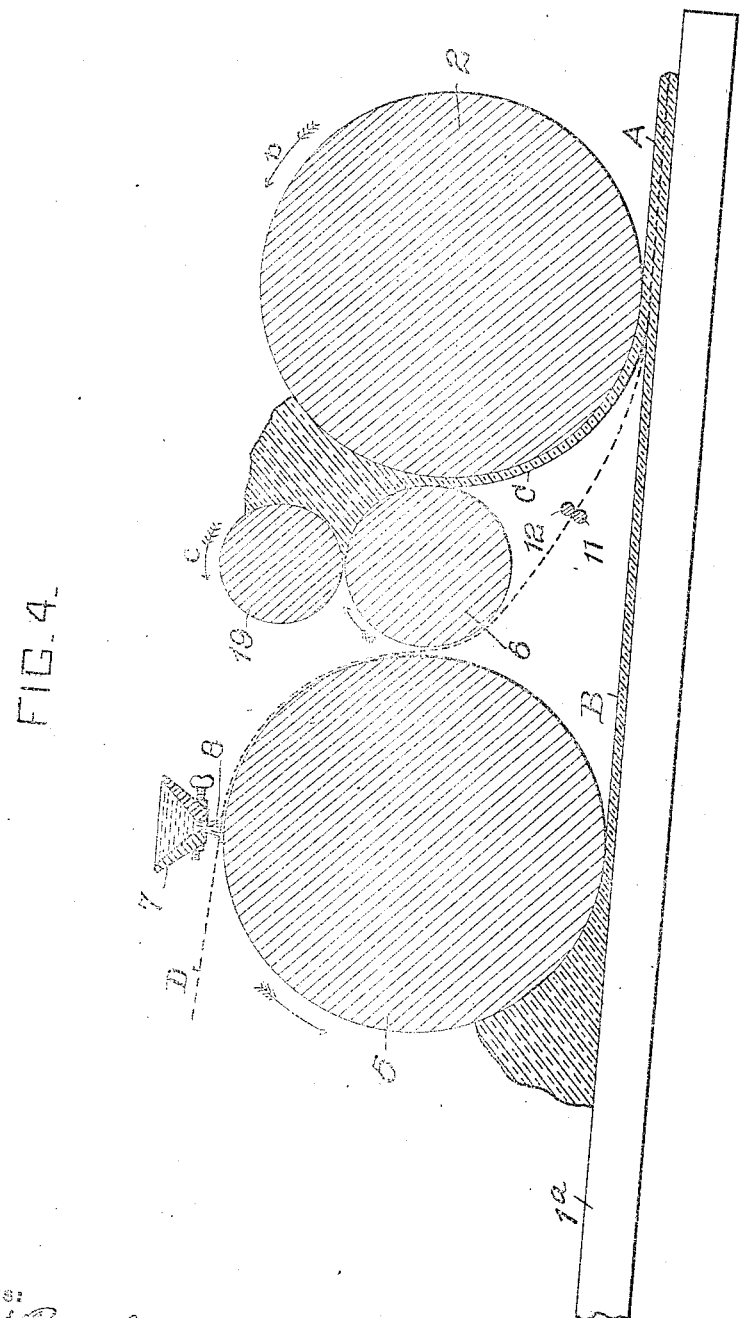

No. 839,573. PATENTED DEC. 25, 1906.
N. FRANZEN.
METHOD OF AND MACHINE FOR MAKING WIRE GLASS.
APPLICATION FILED JUNE 4, 1906.
2 SHEETS—SHEET 1.
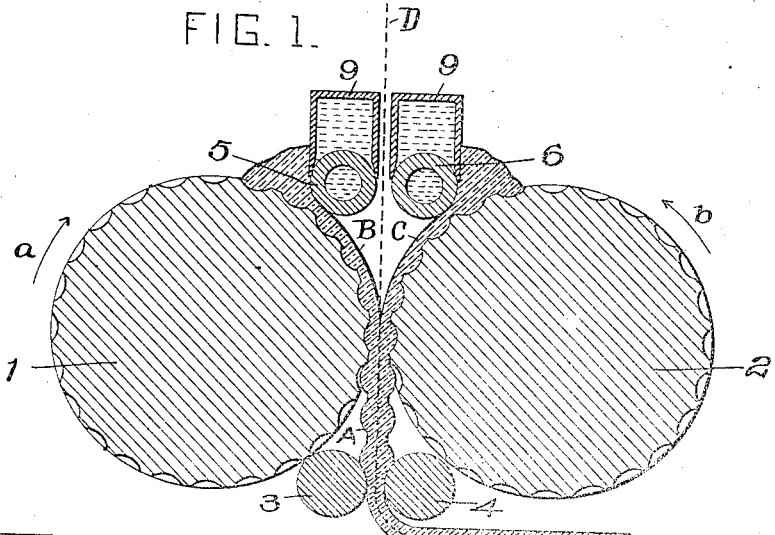
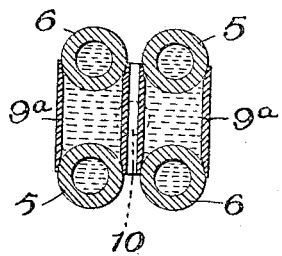
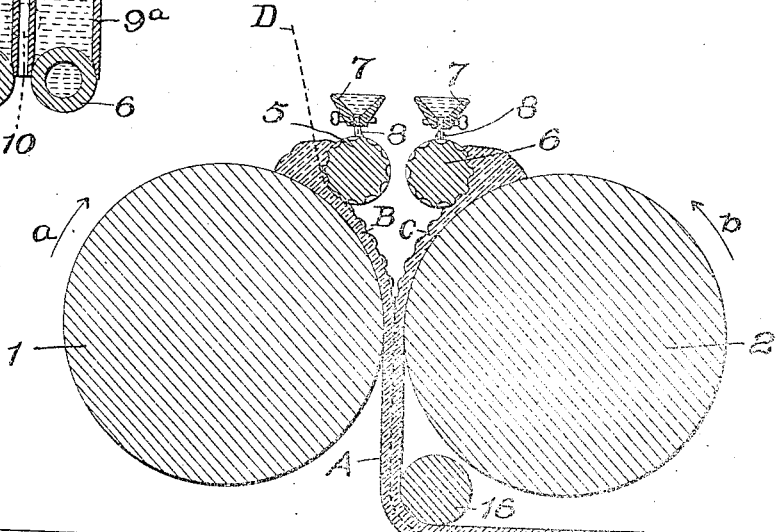
WITNESSES:
J. Herbert Bradley.
Wm. H. Wilson.
INVENTOR
Nicklas Franzen
by Christy and Christy,
Attys.

No. 839,573. PATENTED DEC. 25, 1906.
N. FRANZEN.
METHOD OF AND MACHINE FOR MAKING WIRE GLASS.
APPLICATION FILED JUNE 4, 1906.

2 SHEETS—SHEET 2.

WITNESSES:
J. Herbert Bradley.
Wm. H. Wilson.

Nicholas Franzen
by Christy and Christy
Atty's
INVENTOR

UNITED STATES PATENT OFFICE.

NICKLAS FRANZEN, OF MONONGAHELA, PENNSYLVANIA, ASSIGNOR TO THE PITTSBURG PLATE GLASS COMPANY, OF PITTSBURG, PENNSYLVANIA, A CORPORATION OF PENNSYLVANIA.

METHOD OF AND MACHINE FOR MAKING WIRE-GLASS.

No. 839,573.　　　Specification of Letters Patent.　　　Patented Dec. 25, 1906.

Application filed June 4, 1906. Serial No. 320,073.

*To all whom it may concern:*

Be it known that I, NICKLAS FRANZEN, a citizen of the United States, residing at Monongahela city, in the county of Washington and State of Pennsylvania, have invented or discovered certain new and useful Improvements in Methods of and Machines for Making Wire-Glass, of which improvements the following is a specification.

My invention relates to improvements in methods of and machines for making wire-glass; and the object of my improvements is the production of wire-glass of superior quality.

One method of forming wire-glass consists in spreading independent layers of glass upon suitable surfaces and then uniting such independently-spread layers into an integral sheet. In some cases the component wire element is incorporated in one of the layers as that layer is spread. In other cases it is fed between the layers as they are brought together for uniting. A difficulty which is encountered in the practical application of the method outlined above lies in the fact that the surfaces of the component layers are hardened or chilled to an appreciable degree in the spreading operation and that their subsequent union is consequently more or less imperfect or incomplete.

My present improvement concerns this method; and it consists in providing between the molten glass and the former which spreads the molten glass to layer form (and which in the present state of the art is a steel roll) a layer or stratum of substance which will insulate to a greater or less degree against the conduction of heat from the glass to the former and in so insulating will protect the glass from chilling contact with the surface of the former. The effect will be that the layer spread by a former thus insulated will have a surface less chilled or hardened and accordingly in better condition to weld or unite with its fellow. This insulating blanket or stratum with which I envelop the former is preferably steam, and the method is preferably carried into effect in the manner presently to be described.

The mechanism by which I preferably carry out my improvement in method outlined above is shown diagrammatically in the accompanying drawings, which form part of this specification.

Figure 1 shows the essential features of the machine in vertical longitudinal section. Fig. 2 is a like view showing certain parts in alternative form. Fig. 3 is a like view of a detailed part of Fig. 1 shown in alternative form, and Fig. 4 shows also in longitudinal vertical section a machine of somewhat different construction which embodies my present invention in its broader aspect.

Referring to Figs. 1 and 2, a pair of rolls 1 and 2 are so spaced and arranged in respect to one another that when positively rotated in opposite directions, as indicated by the arrows *a* and *b*, they unite into an integral sheet A two layers of glass B and C, previously spread upon their surfaces in the manner hereinafter explained. Means are provided for spreading molten glass to layer form upon the surfaces of rolls 1 and 2 adjacent to and upon the intake side of the pass between them. Such means consists, preferably, of rolls 5 and 6, suitably spaced and arranged relatively to rolls 1 and 2, as indicated in the drawings, and as will readily be understood. These rolls coöperate with rolls 1 and 2 to form hopper-like receptacles, in which molten glass may be teemed and sustained by gravity while the spreading process progresses. These rolls 5 and 6 may be water-cooled, if desired, as indicated in Fig. 1 of the drawings.

The means for producing the steam-blanket which shall envelop rolls 5 and 6 and insulate against heat conduction during the layer-spreading operation are shown in alternative form in the several figures. They consist, essentially, of a water-supply to wet the surfaces of the rolls, and as these wet rolls turn and come into contact with the molten glass the water is vaporized, and the vapor is retained upon or clings to the rolls-surfaces sufficiently to effect the insulation which I have described. In Fig. 1 this moistening means consists of a pair of boxes 9, and rolls 5 and 6 form part of the walls of these boxes. These boxes are designed to contain water, and to that end the contact of the rolls with the adjacent portions of the walls of the boxes is made tight in any well-known manner. These rolls 5 and 6 turning in their place will advance to the molten glass with wet surfaces to effect the described end.

In Fig. 2 I have shown a pair of troughs 7, arranged adjacent to the rolls 5 and 6 and wicks 8 protruding from these troughs and contacting with the surfaces of rolls 5 and 6. These troughs are adapted to contain water or other fluid which fed through wicks 8 effects the proper moistening of the roll-surfaces. Similar construction is illustrated in Fig. 4.

It will be understood that other substances of suitable properties may be used in place of water to effect the described insulation against heat conduction.

I have described rolls 5 and 6 of Fig. 1 as water-cooled, for undue heating of the rolls must be guarded against. In Fig. 3 I have shown further means of guarding against such heating in employing two rolls 5 and two rolls 6, closing the opposite ends of boxes 9ª, and the whole structure rotatable on trunnions 10. If such a structure be employed, when the rolls at one end of the boxes become unduly heated the whole may be swung on its trunnions to bring the rolls at the other end of the boxes into service. In this alternative structure also the rolls may be water-cooled, if desired, as the drawings indicate.

The forming-surface, which in Figs. 1 and 2 appears as a roll 1, may be a casting-table 1ª, as shown in Fig. 4. With it the spreading-roll 5 coöperates, as in the other case, to spread the molten glass to layer form, and upon it the two layers of glass B and C are united upon fabric D by roll 2. In this case I have shown roll 5 alone provided with heat-insulating means, and the particular means to this end (shown in Fig. 4) is the same as the means shown in Fig. 2. An additional roll 19, positively driven in the direction indicated by arrow c, may be employed, if desired, to enlarge the hopper for molten glass to be spread between rolls 2 and 6.

Though heretofore proposed, it has in fact been impossible to roll molten glass to sheet form between a pair of rolls with such success as to render the project commercially practicable. It has heretofore been found necessary to begin rolling when the teeming of the hot glass begins; otherwise the batch of glass chills or cools against the roll-bodies to such an extent that frequently the rolls when set in motion slip upon the batch of glass, and, on the other hand, if rolling commences when the pouring commences there is great waste. I have made this project of rolling between a pair of rolls commercially possible by making rough the surface of one or both of the rolls. I preferably form pits or cavities or culs-de-sac in the roll-surface in the manner set forth in my application for Letters Patent filed June 7, 1905, Serial No. 264,130. The roll-surface so roughened makes such contact with or gets such purchase on the molten glass that the glass may be successfully spread without the liability to slip which is incident to the use of smooth rolls. In Fig. 1 I have shown rolls 1 and 2 so pitted, and the sheet A, passing from between rolls 1 and 2, with the pimpled or uneven surface described in my application above referred to. The humps or excrescenses are in consequence of the air entrapped by the molten glass in the pits of the roll-surface unchilled and soft, and the plate A, Fig. 1, may be passed between finishing-rolls 3 and 4 to produce a sheet of great smoothness.

Instead of pitting the surfaces of rolls 1 and 2 I may pit the surface of either or both rolls 5 and 6, as indicated in Fig. 2, or, as will readily be understood, I may pit the surfaces of all four rolls. In case rolls 5 and 6 or either of them are pitted advantages follow such as may dispense with the wetting of these rolls. This matter is, however, set forth in another application for Letters Patent executed by me on even date herewith. It will be understood that any roughening of the surfaces of these rolls will effect, in some measure at least, the end herein described as incident to the use of pitted rolls.

In Fig. 2 the sheet A after completion is delivered on the surface of a table 15, and, if desired, this table may bear a surface-pattern into which the sheet may be pressed by a roll 16.

Up to this point I have made no reference to the wire, and while it will be observed that the machine will produce plates of glass whether wire be introduced or not and that my invention is not necessarily limited in that regard the fact remains that the object is to introduce wire and produce wire-glass. The wire (indicated in the drawings at D) may, as shown in Fig. 1, be introduced with the pass between the rolls 1 and 2, where the roll-surfaces faced with layers of glass approach one another, and in such case the layers will be welded through the meshes of the wire, or, as shown in Fig. 2, the wire may be introduced beneath one of the rolls 5 and 6, and in such case one of the component layers will advance to union with its fellow having the wire embedded in its proximate surface. I preferably introduce the wire centrally, as shown in Figs. 1 and 4. In that case it is heated by radiation from layers B and C and accordingly expanded before it comes into contact with the glass.

For present commercial purposes the wire D is in the form of netting; but obviously it may be in loose strands or may be made up in any other desired form. Furthermore, in place of wire any other suitable material may be introduced. While I employ the term "fabric" in the claims, I mean to include in their scope any substance suitable to be inlaid in glass regardless of material and regardless of minute formation and shape.

I preferably provide for heat insulation between both forming-rolls 5 and 6 and the molten glass. It will be understood that my invention will be practiced, though less efficiently, if but one of these rolls be so insulated.

The operation of the parts will readily be understood. The several rolls being adjusted to desired position, molten glass is teemed in two batches E and F into the two hopper-like receptacles formed by and between rolls 1 5 and 2 6. Rotation of the rolls then effects the spreading of layers B and C and the uniting of these layers into the sheet A. The fabric D is simultaneously introduced in the manner already described to produce wire-glass, which is the desired product.

I claim as my invention—

1. In the operation of spreading molten glass to layer form, the herein-described method of producing a layer with soft or unchilled surface which consists in enveloping the surface of the former which is employed to spread the layer with a stratum of heat-insulating substance in fluid form, substantially as described.

2. In the operation of spreading molten glass to layer form, the herein-described method of producing a layer with soft or unchilled surface which consists in wetting the surface of the former which is employed to spread the layer previous to the contact of the former with the molten glass, substantially as described.

3. In a machine for making plate-glass, the combination of a forming-surface, a roll coöperating with said surface to spread molten glass to layer form thereon, and means for applying to the surface of said roll an envelop of heat-insulating substance, substantially as described.

4. In a machine for making plate-glass, the combination of a forming-surface, a rotating roll whose surface coöperates during a portion of the rotation of the roll with the forming-surface to spread molten glass to layer form thereon, a fluid-receptacle arranged adjacent to said roll, a portion of the wall of said fluid-receptacle being progressively formed by a portion of the surface of said roll when said portion is not coöperating with said forming-surface, substantially as described.

5. In a machine for making plate-glass, the combination of a forming-surface, a pair of rolls, each when in operative position coöperating with said surface to spread molten glass to layer form thereon, means for bringing said pair of rolls alternately into operative position, substantially as described.

6. In a machine for making plate-glass, the combination of a forming-surface, a swinging fluid-receptacle arranged adjacent to said surface, a pair of rolls forming portion of the wall of said fluid-receptacle, and each of said pair of rolls as said fluid-receptacle swings coöperating with said forming-surface to spread molten glass to layer form thereon, substantially as described.

7. In a machine for making plate-glass, the combination of a forming-surface, a roll coöperating with said surface to spread molten glass to layer form thereon, a fluid-receptacle arranged adjacent to said second roll, and a wick extending from said receptacle and contacting with said second roll, substantially as described.

8. In a machine for making wire-glass, the combination of a pair of rolls rotating to unite upon a fabric fed into the pass between them, layers of glass spread upon their several surfaces, means for spreading molten glass to layer form upon the surfaces of said rolls, and means for applying to the surface of said layer-forming means at the time the layers are spread an envelop of heat-insulating substance, substantially as described.

9. In a machine for making wire-glass, the combination of a pair of pitted rolls rotating to unite upon a fabric fed into the pass between them layers of glass spread upon their several surfaces, means for spreading molten glass to layer form upon the surfaces of said rolls, means for applying to the surface of said layer-forming means at the time when the layers are spread an envelop of heat-insulating substance, and a pair of finishing-rolls, substantially as described.

In testimony whereof I have hereunto set my hand.

NICKLAS FRANZEN.

Witnesses:
BAYARD H. CHRISTY,
CHARLES BARNETT.